US012197010B2

(12) United States Patent
Ido et al.

(10) Patent No.: US 12,197,010 B2
(45) Date of Patent: Jan. 14, 2025

(54) REINFORCEMENT SLEEVE HEATING DEVICE AND FUSION SPLICING MACHINE

(71) Applicant: SUMITOMO ELECTRIC OPTIFRONTIER CO., LTD., Yokohama (JP)

(72) Inventors: Shohei Ido, Yokohama (JP); Kazufumi Joko, Yokohama (JP); Ryosuke Meo, Yokohama (JP); Hiroshi Takayanagi, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 561 days.

(21) Appl. No.: 17/425,983

(22) PCT Filed: Dec. 19, 2019

(86) PCT No.: PCT/JP2019/049938
§ 371 (c)(1),
(2) Date: Jul. 27, 2021

(87) PCT Pub. No.: WO2020/158240
PCT Pub. Date: Aug. 6, 2020

(65) Prior Publication Data
US 2022/0155523 A1   May 19, 2022

(30) Foreign Application Priority Data

Jan. 30, 2019   (JP) .................................. 2019-014512

(51) Int. Cl.
*G02B 6/255*   (2006.01)

(52) U.S. Cl.
CPC ......... *G02B 6/2551* (2013.01); *G02B 6/2553* (2013.01); *G02B 6/2558* (2013.01)

(58) Field of Classification Search
CPC .. G02B 6/2551; G02B 6/2558; G02B 6/2553; G02B 6/387; G02B 6/4476; G02B 6/255; G02B 6/3849
See application file for complete search history.

(56) References Cited

U.S. PATENT DOCUMENTS

| | | |
|---|---|---|
| 2013/0315544 A1 | 11/2013 | Fukuda et al. |
| 2016/0131840 A1 | 5/2016 | Kawanishi |
| 2018/0356594 A1 | 12/2018 | Zhao |

FOREIGN PATENT DOCUMENTS

| | | |
|---|---|---|
| CN | 203275701 U | 11/2013 |
| CN | 207895106 U | 9/2018 |

(Continued)

*Primary Examiner* — Balram T Parbadia
*Assistant Examiner* — Mary A El-Shammaa
(74) *Attorney, Agent, or Firm* — Oliff PLC

(57) ABSTRACT

A reinforcement sleeve heating device is a reinforcement sleeve heating device heating a reinforcement sleeve put on a connecting site to shrink the reinforcement sleeve in order to reinforce the connecting site of optical fibers fusion-spliced to each other. The reinforcement sleeve heating device includes: a heating element forming a housing space, the housing space extending in a predetermined direction, the housing space being opened in one direction intersecting with the predetermined direction, the housing space being capable of disposing the reinforcement sleeve, and a cover disposed at a position at which at least a part of the opening of the housing space. In a state in which the reinforcement sleeve is disposed in the housing space, the cover includes a contact surface brought into contact with the reinforcement sleeve in a direction of pushing the reinforcement sleeve into an inside of the housing space.

7 Claims, 14 Drawing Sheets

(56) References Cited

FOREIGN PATENT DOCUMENTS

| | | |
|---|---|---|
| JP | S60-23813 U | 2/1985 |
| JP | S60-46510 A | 3/1985 |
| JP | 2005-257855 A | 9/2005 |
| JP | 2017-142469 A | 8/2017 |
| KR | 10-2014-0004684 A | 1/2014 |

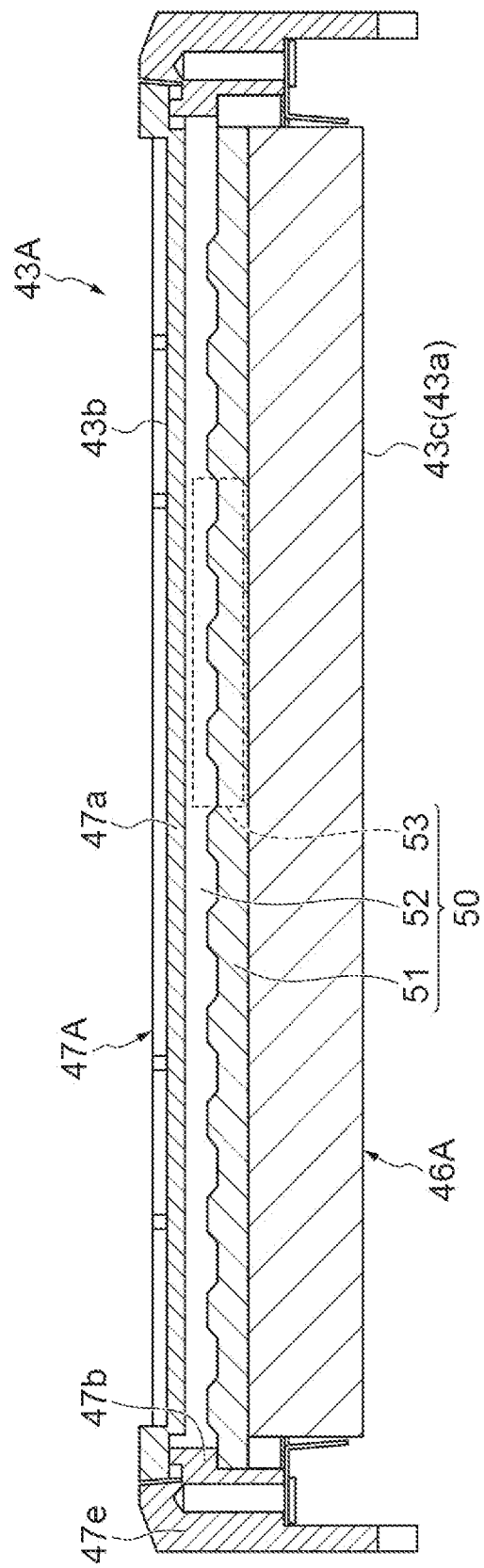

REINFORCEMENT SLEEVE HEATING DEVICE AND FUSION SPLICING MACHINE

TECHNICAL FIELD

An aspect of the present disclosure relates to a reinforcement sleeve heating device and a fusion splicing machine.

The present application claims the benefit based upon Japanese Patent Application 2019-014512 filed on Jan. 30, 2019, the entire content of which is incorporated herein by reference.

BACKGROUND ART

Patent Literature 1 describes a heat treatment apparatus fir a fiber reinforcement member. This heat treatment apparatus is an apparatus that thermal shrinks a fiber reinforcement member put on a fusion-spliced part in order to reinforce the fusion-spliced part of an optical fiber. The heat treatment apparatus has a housing unit that houses the fiber reinforcement member, and includes a sheet-shaped heating unit having a heating part curved in a U-shape and a cover that covers the housing unit.

CITATION LIST

Patent Literature

Patent Literature 1: Japanese Unexamined Patent Publication No. 2005-257855

SUMMARY OF INVENTION

An aspect of the present disclosure is a reinforcement sleeve heating device heating a reinforcement sleeve put on a connecting site to shrink the reinforcement sleeve in order to reinforce the connecting site of optical fibers fusion-spliced to each other. The reinforcement sleeve heating device includes: a heating element forming a housing space, the housing space extending in a predetermined direction, the housing space being opened in one direction intersecting with the predetermined direction, the housing space being capable of disposing the reinforcement sleeve, and a cover disposed at a position at which at least a part of the opening of the housing space. In a state in which the reinforcement sleeve is disposed in the housing space, the cover includes a contact surface brought into contact with the reinforcement sleeve in a direction of pushing the reinforcement sleeve into an inside of the housing space.

BRIEF DESCRIPTION OF DRAWINGS

FIG. 10B is a cross sectional view taken along the long-side direction of the cover in FIG. 7.

DESCRIPTION OF EMBODIMENTS

Figure 1A:
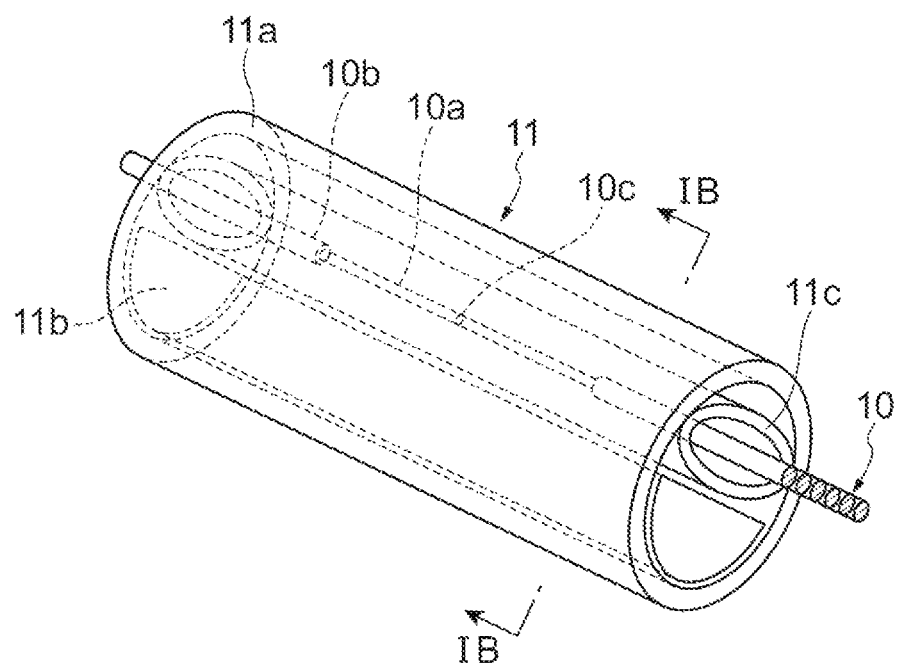
FIG. 1A is a schematic perspective view showing an example of a state in which a reinforcement sleeve is put on the vicinity of the connecting site of an optical fiber.

Problem to be Solved by Present Disclosure

In the heat treatment apparatus of Patent Literature 1 described above, in the contact region of the reinforcement sleeve that is a fiber reinforcement member with the heating unit of the sheet-shaped heating element, the reinforcement sleeve is heat-treated. Therefore, for example, it is considered that the efficiency of heat treatment is more degraded as the contact region of the reinforcement sleeve with the heating unit is narrower in the case in which the diameter of the reinforcement sleeve is relatively small, and in any other case. As a result, in some case, a lot of time is spent for shrinking the reinforcement sleeve, and a waste of electric power is increased.

It is an object of an aspect of the present disclosure to provide a reinforcement sleeve heating device and a fusion splicing machine that can improve the efficiency of heat treatment hating a reinforcement sleeve.

Effect of Present Disclosure

In accordance with the reinforcement sleeve heating device and the fusion splicing machine according to an aspect of the present disclosure, the efficiency of heat treatment heating the sleeve can be improved.

DESCRIPTION OF EMBODIMENTS

First, the content of embodiments of the present disclosure will be described in enumeration.

A reinforcement sleeve heating device according to an aspect of the present disclosure is a reinforcement sleeve heating device heating a reinforcement sleeve put on a connecting site to shrink the reinforcement sleeve in order to reinforce the connecting site of optical fibers fusion-spliced to each other. The reinforcement sleeve heating device includes: a heating element forming a housing space, the housing space extending in a predetermined direction, the housing space being opened in one direction intersecting with the predetermined direction, the housing space being capable of disposing the reinforcement sleeve, and a cover disposed at a position at which at least a part of the opening of the housing space. In a state in which the reinforcement sleeve is disposed in the housing space, the cover includes a contact surface brought into contact with the reinforcement sleeve in a direction of pushing the reinforcement sleeve into an inside of the housing space.

In this reinforcement sleeve heating device, the contact surface is brought into contact with the reinforcement sleeve in the direction of pushing the reinforcement sleeve into the inside of the housing space, and thus the area of the contact region in which the reinforcement sleeve is in contact with the heating element is expanded. Therefore, the quantity of heat conducted from the heating element to the reinforcement sleeve is increased, and the efficiency of heat treatment heating the reinforcement sleeve can be improved. In the inner surface of the housing space of the heating element, the area of the non-contact region in which no contact is made with the reinforcement sleeve is narrowed, and thus the quantity of heat dissipated from the non-contact region is decreased, and the quantity of heat wasted until the completion of heat treatment can be reduced. Accordingly, the efficiency of heat treatment heating the reinforcement sleeve can be improved.

Meanwhile, it is considered that a plurality of types of reinforcement sleeves in different sizes to each other is used corresponding to the types of optical fibers in order to reinforce the connecting site of the optical fibers fusion-spliced to each other. In such a case, desirably, the reinforcement sleeve heating device improves heating efficiency of each of a plurality of types of reinforcement sleeves in different sizes to each other.

The cover may be configured in which a position of the contact surface is variable in the pushing direction. In this case, the position of the contact surface can be adjusted such that the contact surface is brought into contact with the reinforcement sleeve corresponding to each of a plurality of types of reinforcement sleeves in sizes different from each other in the depth direction of the housing space. Therefore, the improvement of heating efficiency can be intended to each of a plurality of types of reinforcement sleeves in sizes different from each other in the depth direction of the housing space.

The cover may have a contact member including the contact surface, a retaining member configured to retain the contact member, and a spring provided on the retaining member, the spring being configured to act elastic force on the contact member in the pushing direction. In this case, the position of the contact surface is easily adjusted corresponding to each of a plurality of types of reinforcement sleeves in sizes different from each other in the depth direction of the housing space. Accordingly, even in the case in which a large number of types are provided, the expansion of the area of the contact surface can be intended corresponding to the reinforcement sleeves.

The cover may have a contact member including the contact surface, and a switching mechanism configured to switch a position of the contact member step by step in the pushing direction. In this case, the position of the contact surface can be easily adjusted corresponding to each of a plurality of types of reinforcement sleeves in sizes different from each other in the depth direction of the housing space.

The cover may have a switching mechanism configured to switch a position of the contact member step by step in the pushing direction. In this case, the position of the contact surface can be easily adjusted corresponding to each of a plurality of types of reinforcement sleeves in sizes different from each other in the depth direction of the housing space.

The cover may be made of a resin. In this case, in comparison with the case in which the cover is made of a metal and the like, for example, the heat insulation performance of the cover can be enhanced, and thus the escaping of heat from the heating element to the outside through the cover is suppressed. Accordingly, the efficiency of heat transfer between the heating element and the reinforcement sleeve can be improved.

The cover may be formed hollow. In this case, the heat insulation performance of the cover is enhanced due to the cavity, and thus the escaping of heat from the heating element to the outside through the cover is suppressed. Accordingly, the efficiency of heat transfer between the heating element and the reinforcement sleeve can be improved.

A fusion splicing machine according to another aspect of the present disclosure includes a fusion splicing device configured to fusion-splice the optical fibers to each other, and the reinforcement sleeve heating device according to any one described above. The fusion splicing machine includes the reinforcement sleeve heating device according to any one described above, and thus the area of the contact region in which the reinforcement sleeve is in contact with the inner surface of the heating element is expanded. Consequently, the efficiency of heat treatment heating the reinforcement sleeve can be improved.

Detail of Embodiments

In the following, specific examples of a reinforcement sleeve heating device and a fusion splicing machine according to an aspect of the present disclosure will be described with reference to the drawings. It should be noted that the present invention is not limited to these examples, and is intended to include all modifications within the meaning described in claims and equivalent to the scope of claims. In the following description, the same components or components having the same functions are designated with the same reference signs, and the duplicated description is sometimes omitted.

Figure 1B:
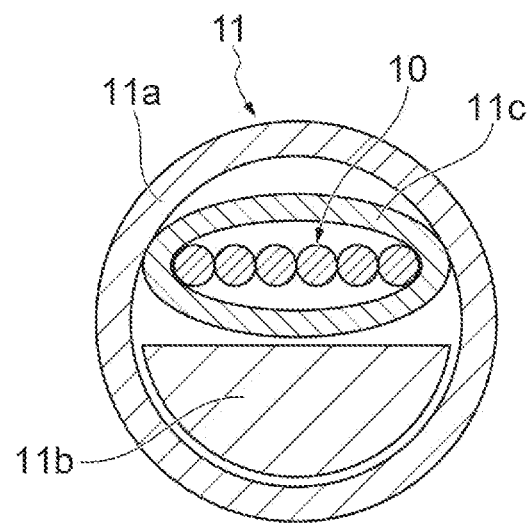
FIG. 1B is a cross sectional view taken along line 1B-1B in FIG. 1A.

First, an optical fiber for which a reinforcement sleeve heating device and a fusion splicing machine are used will be described. FIG. 1A is a schematic perspective view showing an example of a state in which the reinforcement sleeve is put on the vicinity of the connecting site of the optical fiber. FIG. 1B is a cross sectional view taken along line 1B-1B in FIG. 1A. The reinforcement sleeve heating device and the fusion splicing machine may be used for fusion-splicing a single-core optical fiber 10, or may be used for fusion-splicing a multicore optical fiber 10 as shown in FIGS. 1A and 1B. Alternatively, the reinforcement sleeve heating device and the fusion splicing machine may be used for fusion-splicing a drop cable 12 having an optical fiber 10 (see FIG. 4).

The optical fiber 10 includes a glass part 10a and a cladding part 10b covering the glass part 10a. At the tip end part of the optical fiber 10, the cladding part 10b is removed, and the glass part 10a is exposed. In the optical fiber 10, the end faces 10c, at which the tip end parts contact with each other where the glass part 10a is exposed, are fusion-spliced to each other.

On the connecting site of the fusion-spliced optical fibers 10, a reinforcement sleeve 11 that reinforces the connecting site is put. The reinforcement sleeve 11 is composed of a thermal shrinkage tube 11a, and a tensile strength body 11b and an inner tube 11c disposed in the thermal shrinkage tube 11a. The tensile strength body 11b is formed of a metal or glass fiber, for example. The inner tube 11c is formed of a hot melt resin. As the reinforcement sleeve 11, a plurality of types of reinforcement sleeves having the sizes (e.g. diameters) different from each other is used.

Figure 2:
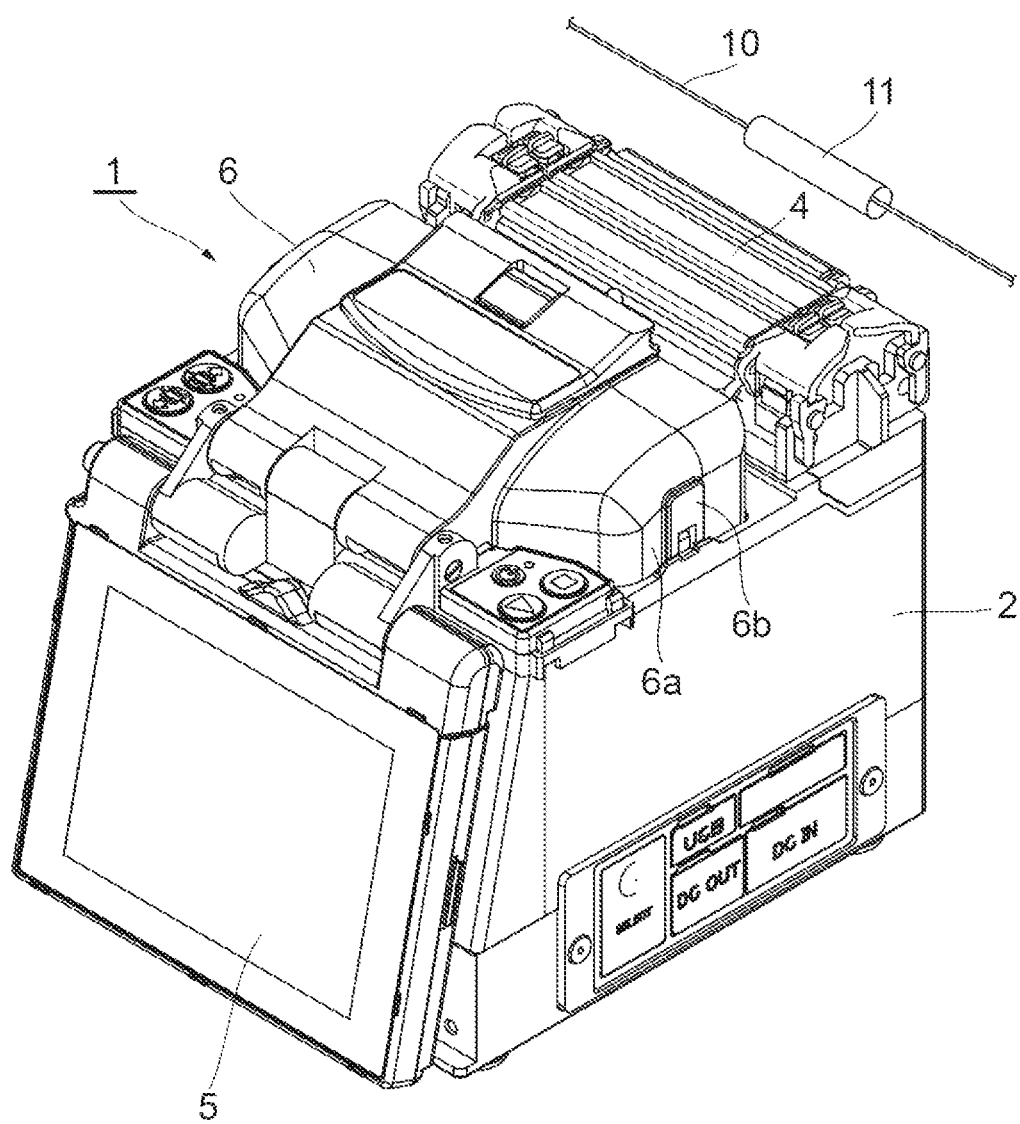
FIG. 2 is a perspective view showing the appearance of a fusion splicing machine.
Figure 3:
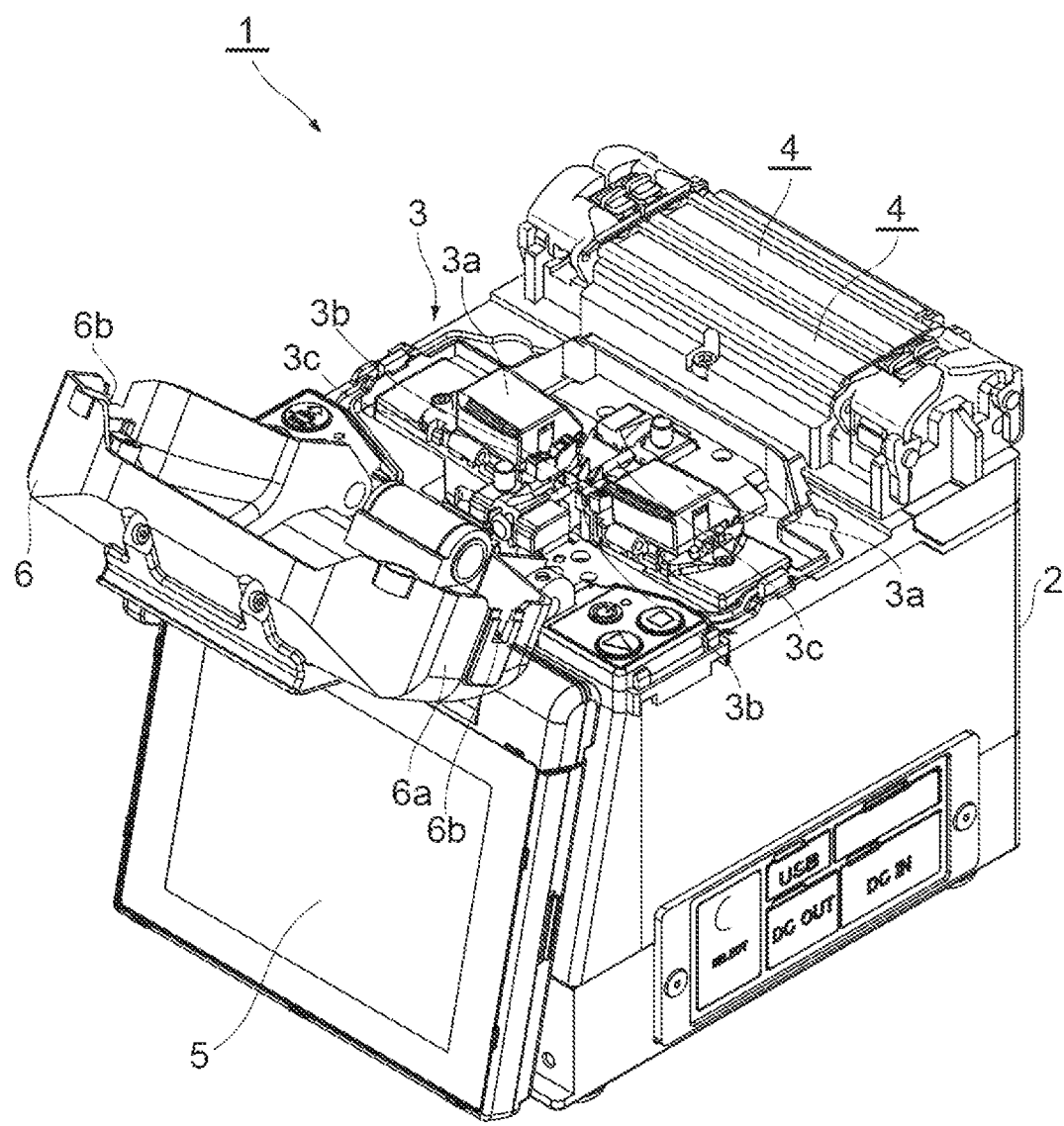
FIG. 3 is a perspective view showing the appearance of the fusion splicing machine.

The fusion splicing machine is a device that fusion splices the optical fibers 10 to each other. FIGS. 2 and 3 are perspective views showing the appearance of the fusion splicing machine. FIG. 2 shows the appearance in the state in which a wind protection cover is closed, and FIG. 3 shows the appearance in the state in which the wind protection cover is opened and the internal structure of the fusion splicing machine is seen. A fusion splicing machine 1 shown in FIGS. 2 and 3 includes a housing 2 in a box shape. On the upper part of this housing 2, a fusion splicing device 3 that fusion-splices the optical fibers 10 to each other and a plurality (e.g. two) reinforcement sleeve heating devices 4 are provided. The fusion splicing machine 1 includes a monitor 5 that displays the state of fusion-splicing to each other, the optical fibers 10 being captured by a camera (not shown) disposed in the inside of the housing 2. The fusion splicing machine 1 further includes a wind protection cover 6 that prevents winds from entering the fusion splicing device 3.

The fusion splicing device 3 has a holder installation part on which a pair of optical fiber holders 3a is installable, a pair of fiber positioning units 3b, and a pair of discharge electrodes 3c. The optical fibers 10 targeted for fusion splicing are retained and fixed to the optical fiber holders 3a, and the optical fiber holders 3a are installed and fixed to the holder installation parts. The fiber positioning units 3b are disposed between the optical fiber holders 3a, and position the tip end parts of the optical fibers 10 individually retained on the optical fiber holders 3a. The discharge electrode 3c is disposed between the fiber positioning units 3b, and is an electrode that fusion-splices the tip ends of the optical fibers 10 together with arc discharge.

The wind protection cover 6 is coupled to the housing 2 so as to openably cover the fusion splicing device 3. On each of side surfaces 6a of the wind protection cover 6, an inlet port 6b that introduces the optical fiber 10 into the fusion splicing device 3 (i.e., into each of the optical fiber holder 3a) is formed.

Figure 4:
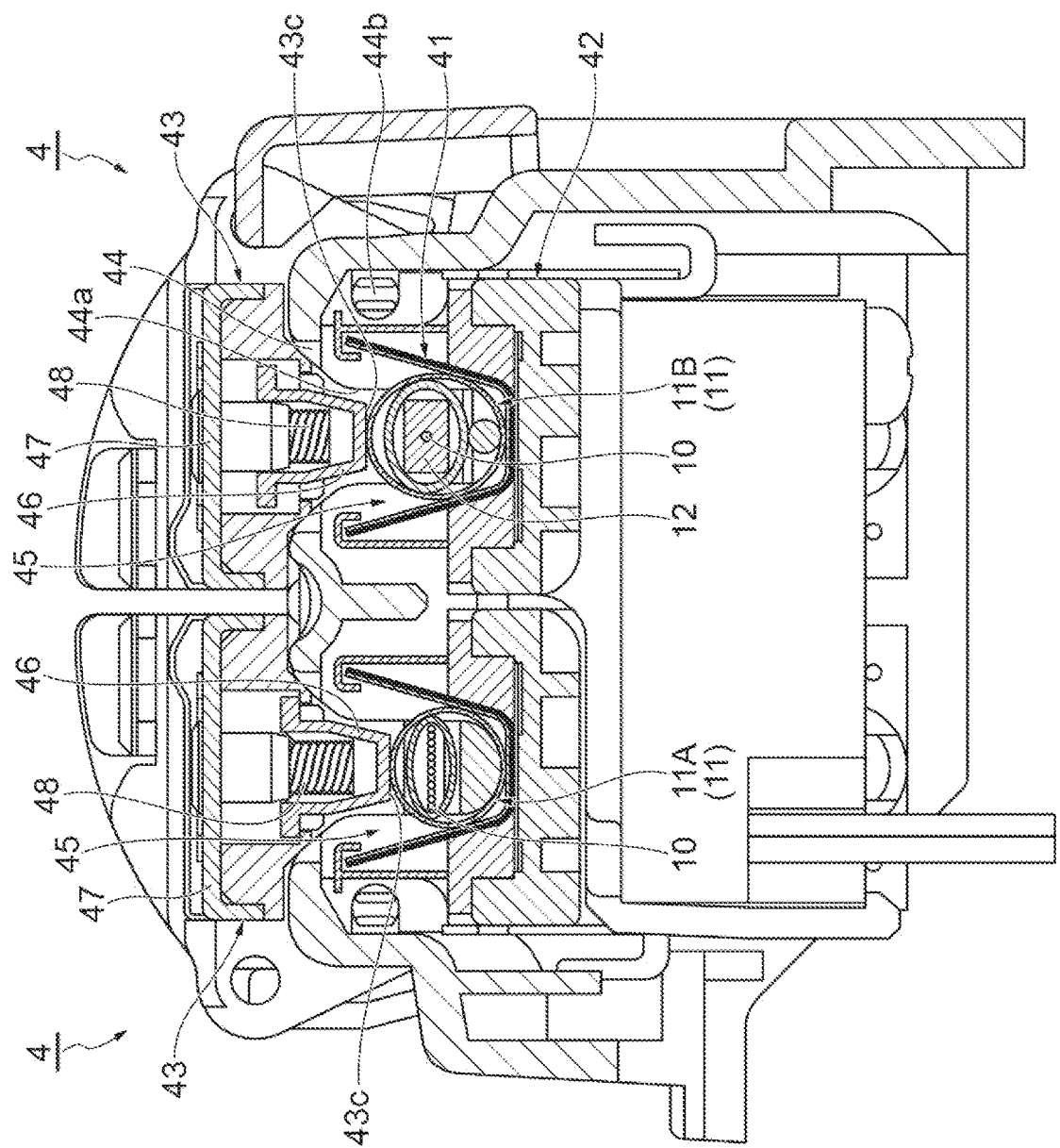
FIG. 4 is a cross sectional view showing a reinforcement sleeve heating device in FIG. 2.
Figure 5:
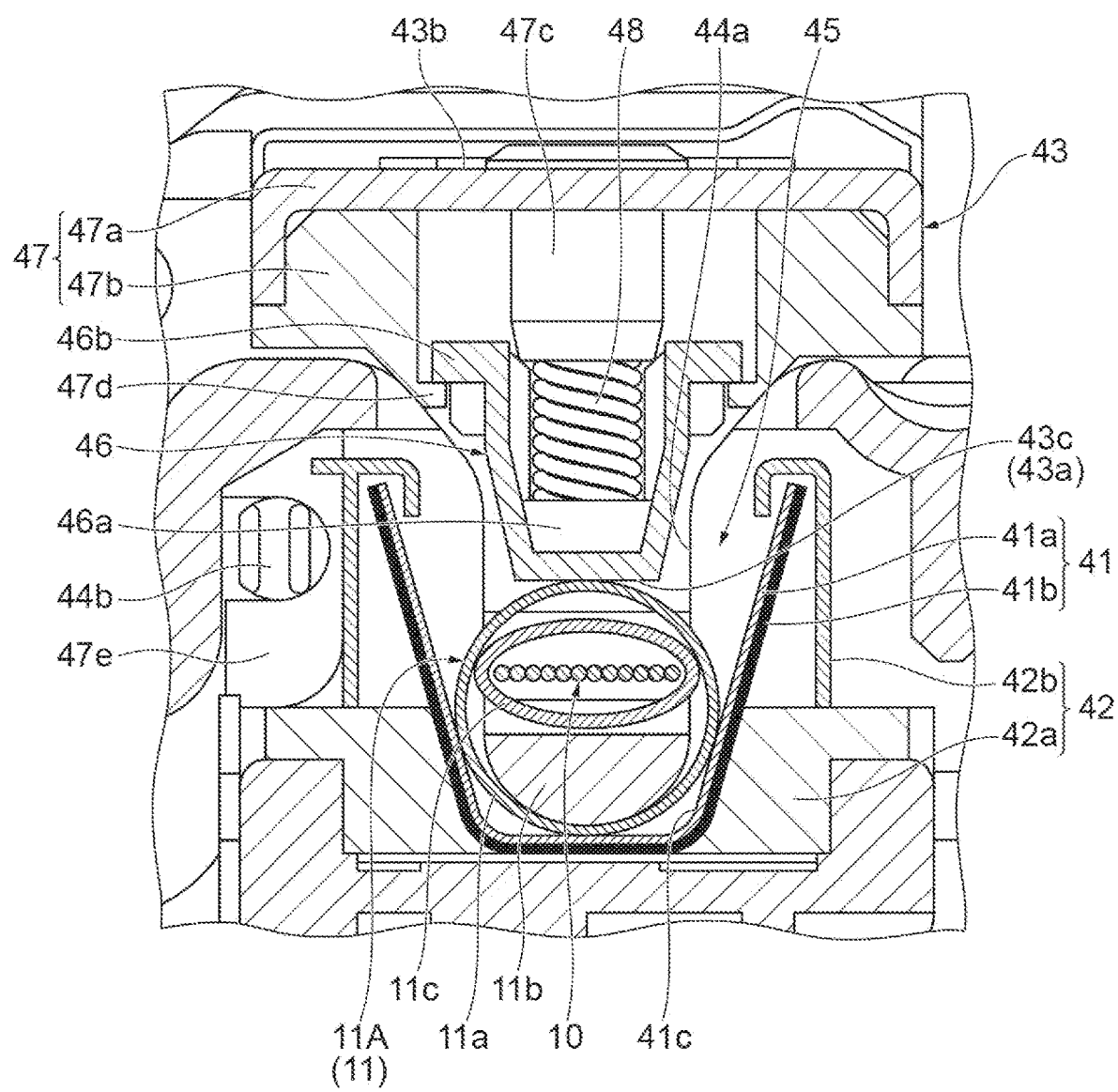
FIG. 5 is a cross sectional view showing FIG. 4 partially expanded.

The reinforcement sleeve heating device 4 is a device that heats the reinforcement sleeve 11 put on the connecting site and shrinks the reinforcement sleeve 11 in order to reinforce the connecting site of the fusion-spliced optical fibers 10 in the fusion splicing device 3. These two reinforcement sleeve heating device 4 are arranged side by side adjacent to the fusion splicing device 3, for example. FIG. 4 is a cross sectional view showing the reinforcement sleeve heating devices 4 in FIG. 2 when the reinforcement sleeve 11 is heated. FIG. 5 is a cross sectional view showing FIG. 4 partially expanded. As shown in FIGS. 4 and 5, the reinforcement sleeve heating device 4 includes a heating element 41, a heating element retaining part 42, and a cover 43.

The heating element 41 forms a housing space 45 capable of disposing the reinforcement sleeve 11. The housing space 45 extends along a predetermined direction (e.g. the direction in which the pair of optical fiber holders 3a is arranged) and is opened in one direction (here, upward) intersecting with the predetermined direction. The heating element 41 includes, for example, a heat dissipation plate 41a in a U-shape in a cross section, and a film type heater 41b in a U-shape in a cross section bonded to the outer surface of the heat dissipation plate 41a. The heat dissipation plate 41a is an aluminum plate, for example. An inner surface 41c of the heat dissipation plate 41a generates heat due to the heat from the film type heater 41b. The housing space 45 is formed of this inner surface 41c. The reinforcement sleeve 11 is disposed in the housing space 45, and heated by contacting this inner surface 41c. The cross sectional form of the heat dissipation plate 41a and the cross sectional form of the film type heater 41b may be a V-shape, for example.

The heating element retaining part 42 retains the heating element 41 on the housing 2. The heating element retaining part 42 has a base part 42a and a pair of fixing parts 42b. The base part 42a is made of a resin, for example. The base part 42a presents a rectangular parallelepiped in which a predetermined direction is a long-side direction. The base part 42a may be integrated with the housing 2. The base part 42a is formed with a retaining groove extending in the direction in which the housing space 45 extends and opened on the top surface of the base part 42a. In this retaining groove, the lower part of the heating element 41 is disposed. The fixing part 42b is formed of a metal plate member, for example. The pair of fixing parts 42b extends from the top surface of the base part 42a upward sandwiching the retaining groove of the base part 42a. The tip end parts of the pair of fixing parts 42b curve toward the base part 42a so as to hold down the upper end part of the heating element 41 toward the base part 42a.

At both ends in a predetermined direction of the heating element retaining part 42, fiber disposing parts 44 are individually provided. The fiber disposing part 44 is formed with a disposing groove 44a capable of disposing the optical fiber 10. The disposing grooves 44a are located on the extension line of the housing space 45. When the reinforcement sleeve 11 is heated, the optical fibers 10 exposed from the both end parts of the reinforcement sleeve 11 are individually disposed on the disposing grooves 44a.

The cover 43 is configured such that the opening of the housing space 45 is openable and closable. The cover 43 is rotatably coupled to the end part of the fiber disposing part 44 through a rotating shaft 44b. The cover 43 rotates about the rotating shaft 44b to open and close the opening of the housing space 45. The cover 43 is disposed at the position at which the opening of the housing space 45 is covered in the closed state. The cover 43 presents a long shape having a long-side direction that is the direction in which the housing space 45 extends. The cover 43 only has to have the size that covers at least a part of the opening of the housing space 45 in the closed state. However, in the present embodiment, an example is shown in which the cover 43 has the size entirely covering the opening of the housing space 45 and covering the region up to the opening of the disposing groove 44a. When the reinforcement sleeve 11 is heated, the opening of the housing space 45 and the opening of the disposing groove 44a are in the state in which these openings are covered with the cover 43 (i.e., in the closed state).

In FIG. 4, in the housing space 45 of one of the reinforcement sleeve heating devices 4, a reinforcement sleeve 11 put on the connecting site of multi-core (here, 12-core) optical fibers 10 to each other (in the following, sometimes referred to as "a reinforcement sleeve 11A") is disposed. In the housing space 45 of the other of the reinforcement sleeve heating devices 4, a reinforcement sleeve 11 put on the connecting site of the drop cable 12 having an optical fiber 10 (in the following, sometimes referred to as "a reinforcement sleeve 11B") is disposed. The size of the reinforcement sleeve 11B in the depth direction of the housing space 45 is larger than the size of the reinforcement sleeve 11A in this direction.

In the state shown in FIGS. 4 and 5 (i.e., in the closed state), the cover 43 includes an inner surface 43a facing the housing space 45 and an outer surface 43b facing the surface on the opposite side of the inner surface 43a and facing the outside of the space. In the state in which the reinforcement sleeve 11 is disposed in the housing space 45 and the opening of the housing space 45 is covered with the cover 43, a part of the inner surface 43a is in contact with the reinforcement sleeve 11. In other words, the cover 43 includes a contact surface 43c that is brought into contact with the reinforcement sleeve 11 when the reinforcement sleeve 11 is heated. The contact surface 43c is brought into contact with the reinforcement sleeve 11 from the opening side of the housing space 45. In other words, the contact surface 43c is brought into contact with the reinforcement sleeve 11 in the direction of pushing the reinforcement sleeve 11 into the inside of the housing space 45. The cover 43 configured in which the position of the contact surface 43c is variable in the pushing direction. The cover 43 changes the relative position of in the contact surface 43c to the outer surface 43b in the pushing direction by bringing the contact surface 43c and the outer surface 43b close to each other or apart from each other.

Figure 6A:
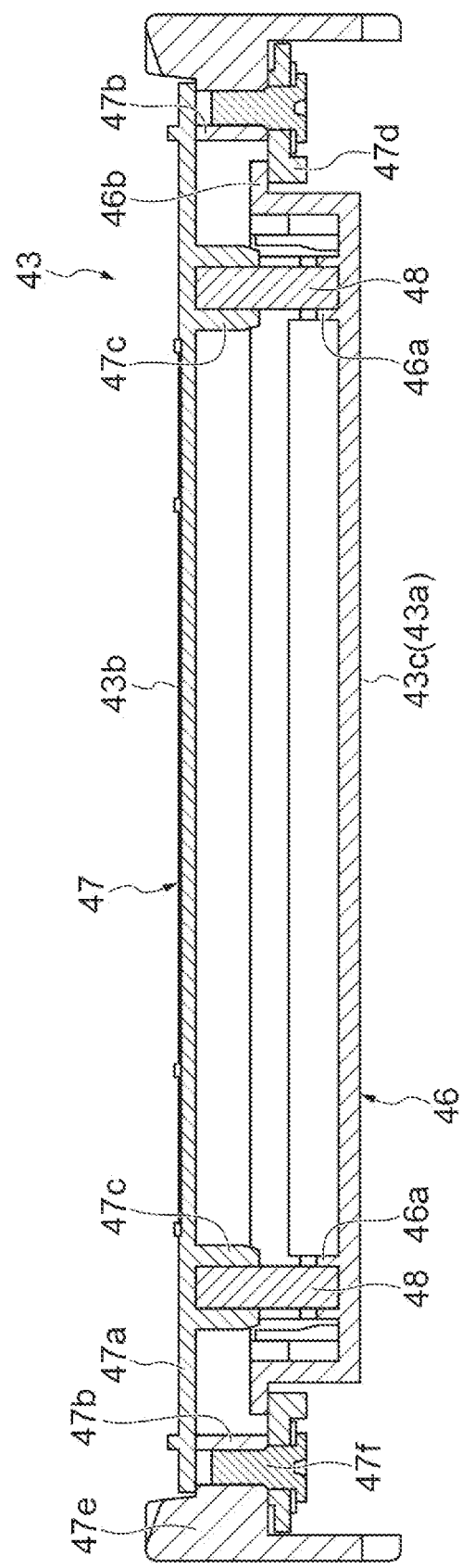
FIG. 6A is a cross sectional view taken along the long-side direction of a cover in FIG. 5.
Figure 6B:
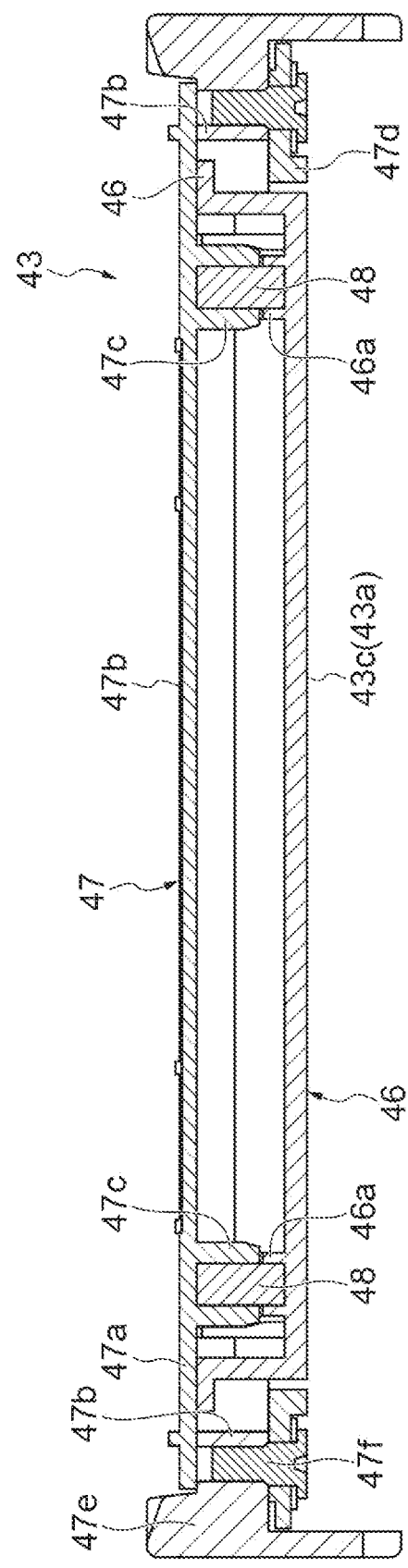
FIG. 6B is a cross sectional view taken along the long-side direction of the cover in FIG. 5.

FIGS. 6A and 6B are cross sectional views taken along the long-side direction of the cover 43 in FIG. 5. FIG. 6A shows the cover 43 in the state in which the outer surface 43b is the most apart from the contact surface 43c, and FIG. 6B shows the cover 43 in the state in which the outer surface 43b is the closest to the contact surface 43c. As shown in FIGS. 4, 5, 6A, and 6B, the cover 43 has a contact member 46 including the contact surface 43c, a retaining member 47 that retains the contact member 46, and a plurality (e.g. two) of springs 48. The contact member 46 and the retaining member 47 are made of a resin, for example. Between the contact member 46 and the retaining member 47, a cavity is formed across near one end and near the other end of the contact member 46. That is, the cover 43 is formed hollow. From the viewpoint from which the disposition state of the reinforcement sleeve 11 in the housing space 45 is visually recognizable, the contact member 46 and the retaining member 47 may be transparent to visible light.

The contact member 46 presents a box shape extending in the long-side direction of the housing space 45 and opened on the opposite side of the housing space 45. The contact surface 43c is formed on the bottom part of the contact member 46. On the back surface of the bottom part on the opposite side of the contact surface 43c, two spring holders 46a that individually retain one end parts of the two springs 48 are provided. At the end part of the contact member 46 on the opening side, a flange 46b is provided. The flange 46b is provided throughout the edge of the end part of the contact member 46 on the opening side, for example.

The retaining member 47 has a cover part 47a including the outer surface 43b and a side wall part 47b. The cover part 47a presents a plate shape, for example. One of the principal surfaces of the cover part 47a is composed of the outer surface 43b. On the back surface of the cover part 47a on the opposite side of the outer surface 43b, two spring holders 47c that individually retain the other end parts of the two springs 48 are provided. The cover part 47a retains the contact member 46 through the springs 48.

The spring 48 is a compressed coil spring, for example. The springs 48 act elastic force on the contact member 46 in the direction of pushing into the inside of the housing space 45 (i.e., in the direction in which the contact surface 43c is separated from the outer surface 43b) in the closed state of the cover 43. For example, in the case in which the reinforcement sleeve 11A (the reinforcement sleeve 11 in the size relatively small in the depth direction of the housing space 45) is disposed in the housing space 45, the reinforcement sleeve 11A is brought into contact with the contact surface 43c to contract the springs 48, and the position of the contact surface 43c is adjusted (see FIGS. 4 and 5). Thus, the contact surface 43c sufficiently reserves the contact state with the reinforcement sleeve 11A. On the other hand, in the case in which the reinforcement sleeve 11B (the reinforcement sleeve 11 in the size relatively large in the depth direction of the housing space 45) is disposed in the housing space 45, the reinforcement sleeve 11B is brought into contact with the contact surface 43c to contract the springs 48, and the position of the contact surface 43c is adjusted (see FIG. 4). Thus, excessively pushing the reinforcement sleeve 11B by the contact surface 43c is suppressed.

The side wall part 47b is disposed between the cover part 47a and the contact member 46. The side wall part 47b presents a frame shape, for example. One of the opening end parts of the side wall part 47b is connected to the edge part of the cover part 47a. The other opening end part of the side wall part. 47b is provided with a projection 47d that regulates the travel of the flange 46b to the housing space 45 side. The projection 47d is provided throughout the edge of the other opening end part of the side wall part 47b, for example. As shown in FIG. 6A, when the elastic force of the springs 48 acts on the contact member 46 in the direction in which the contact surface 43c is separated from the outer surface 43b, the flange 46b is hooked on the projection 47d. Thus, the separation of the contact member 46 from the retaining member 47 is suppressed. The side wall part 47b is provided with a coupling part 47e. The coupling part 47e is a part coupled to the end part of the fiber disposing part 44 through the rotating shaft 44b A configuration may be provided in which the side wall part 47b and the coupling part 47e are formed of components different from each other and fixed to each other using a fixing member 47f or may be formed of one component.

The operations and effects of the reinforcement sleeve heating device 4 and the fusion splicing machine 1 described above will be described. In the reinforcement sleeve heating, device 4 according to the present embodiment, the contact surface 43c is brought into contact with the reinforcement sleeve 11 in the direction of pushing the reinforcement sleeve 11 into the inside of the housing space 45, and thus the area of the contact region in which the reinforcement sleeve 11 is in contact with the inner surface 41c of the heating element 41 is expanded. Consequently, the quantity of heat conducted from the heating element 41 to the reinforcement sleeve 11 is increased, and the efficiency of heat treatment heating the reinforcement sleeve 11 can be improved. In the inner surface 41c of the heating element 41, the area of the non-contact region in which no contact is made with the reinforcement sleeve 11 is narrowed. Thus the quantity of heat dissipated from the non-contact region is decreased, and the quantity of heat wasted until the completion of heat treatment can be reduced. Accordingly, the efficiency of heat treatment heating the reinforcement sleeve 11 can be improved.

Meanwhile, it is considered that in order to reinforce the connecting site of the fusion-spliced optical fibers 10, a plurality of types of reinforcement sleeves 11 in different sizes to each other may be used corresponding to types of the optical fibers 10, for example. Even in such a case, the reinforcement sleeve heating device 4 desirably improves heating efficiency the plurality of types of individual reinforcement sleeves 11.

The cover 43 may be configured in which the position of the contact surface 43c is variable in the pushing direction. In this case, the position of the contact surface 43c can be adjusted such that the contact surface 43c is brought into contact with the reinforcement sleeve 11 corresponding to a plurality of types of reinforcement sleeves 11 in sizes different from each other in the depth direction of the housing space 45. Therefore, the improvement of heating efficiency can be intended to each of the plurality of types of reinforcement sleeves 11 in sizes different from each other in the depth direction of the housing space 45.

The cover 43 may have the contact member 46 including the contact surface 43c, the retaining member 47 that retains the contact member 46, and the springs 48 provided on the retaining member 47, the springs 48 acting elastic force on the contact member 46 in the pushing direction. The cover 43 may adjust the position of the contact surface 43c by elastic force. In this case, the position of the contact surface 43c is easily adjusted corresponding to each of a plurality of types of reinforcement sleeves 11 in sizes different from each other in the depth direction of the housing space 45. Accordingly, even in the case in which a large number of types of the reinforcement sleeves 11 are provided, the expansion of the area of the contact surface 43c can be intended corresponding to the reinforcement sleeves 11.

The cover 43 may be made of a resin. In this case, in comparison with the case in which the cover 43 is made of a metal and any other material, for example, the heat insulation performance of the cover 43 can be enhanced, and thus the escaping of heat from the heating element 41 to the outside through the cover 43 is suppressed. Accordingly, the efficiency of heat transfer between the heating element 41 and the reinforcement sleeve 11 can be improved.

The cover 43 may be formed hollow. In this case, the heat insulation performance of the cover 43 is enhanced due to the cavity, and thus the escaping of heat from the heating element 41 to the outside through the cover 43 is suppressed. Accordingly, the efficiency of heat transfer between the heating element 41 and the reinforcement sleeve 11 can be improved.

The fusion splicing machine 1 according to the present embodiment includes the above-described reinforcement sleeve heating device 4. Accordingly, the area of the contact region in which the reinforcement sleeve 11 is in contact with the inner surface 41c of the heating element 41 is expanded, and the efficiency of heat treatment heating the reinforcement sleeve 11 can be improved.

The reinforcement sleeve heating device and the fusion splicing machine according to the present invention are not limited to the foregoing embodiment, and various modifications are possible. For example, the fusion splicing machine 1 may include a single reinforcement sleeve heating device 4 alone, and the number of the reinforcement sleeve heating devices 4 included in the fusion splicing machine 1 is appropriately changeable.

The cover 43 may have no spring 48. In this case, the cover 43 may be configured in which the position of the contact surface 43c in the pushing direction is variable due to the weight of the contact member 46. Alternatively, the cover 43 may be configured in which the position of the contact surface 43c is variable due to the action other than the elastic force of the springs 48.

Figure 7:
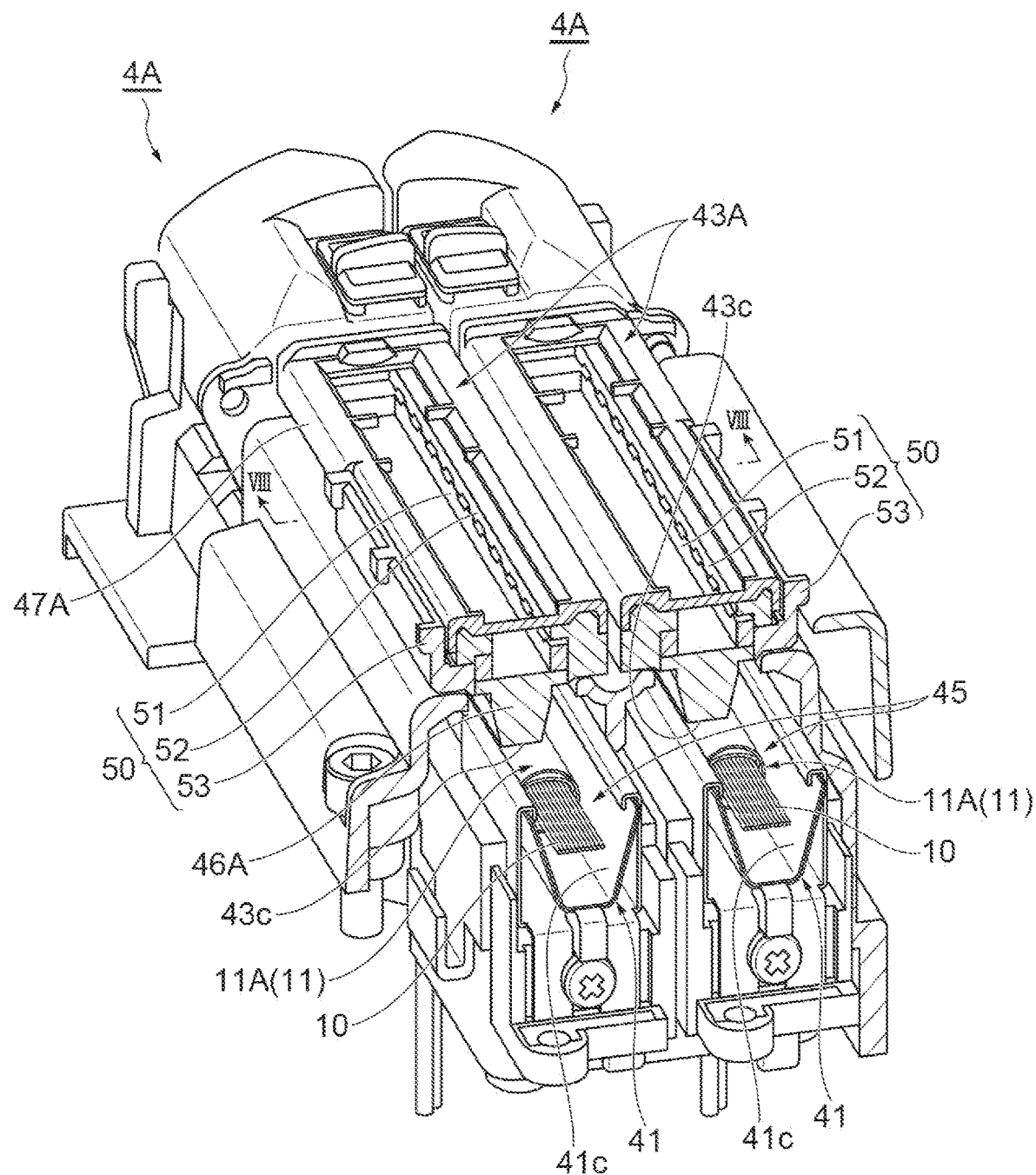
FIG. 7 is a cross sectional perspective view showing an exemplary modification of the reinforcement sleeve heating device.
Figure 8:
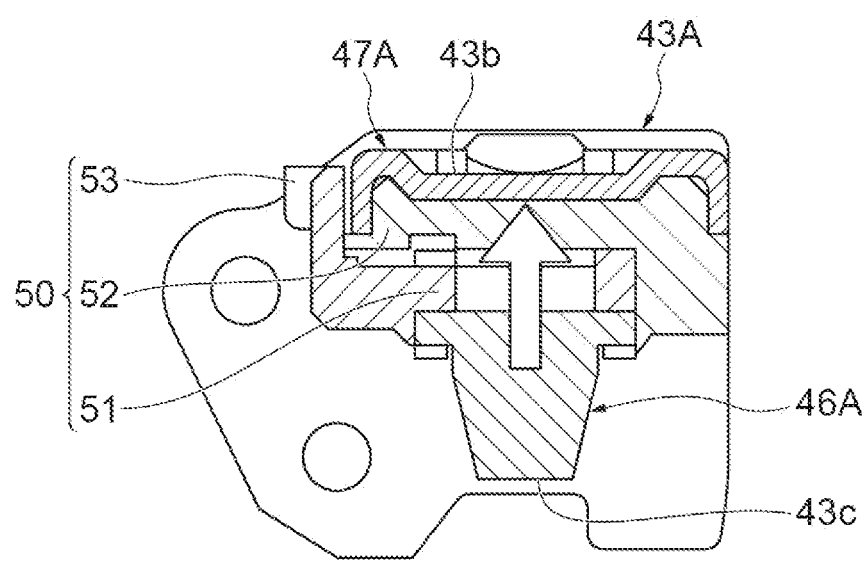
FIG. 8 is a view showing a part of a cross section taken along line VIII-VIII in FIG. 7.

FIG. 7 is a cross sectional perspective view showing an exemplary modification of the reinforcement sleeve heating device. FIG. 8 is a view showing a part of a cross section taken along line VIII-VIII in FIG. 7. The fusion splicing machine 1 may include a reinforcement sleeve heating device 4A shown in FIGS. 7 and 8 instead of the reinforcement sleeve heating device 4.

The reinforcement sleeve heating device 4A is different from the reinforcement sleeve heating device 4 described above in that a cover 43A different from the cover 43 instead of the cover 43 is provided. The reinforcement sleeve heating device 4A may be similarly configured of the reinforcement sleeve heating device 4 on other points. In the following, different points will be mainly described.

Figure 9A:
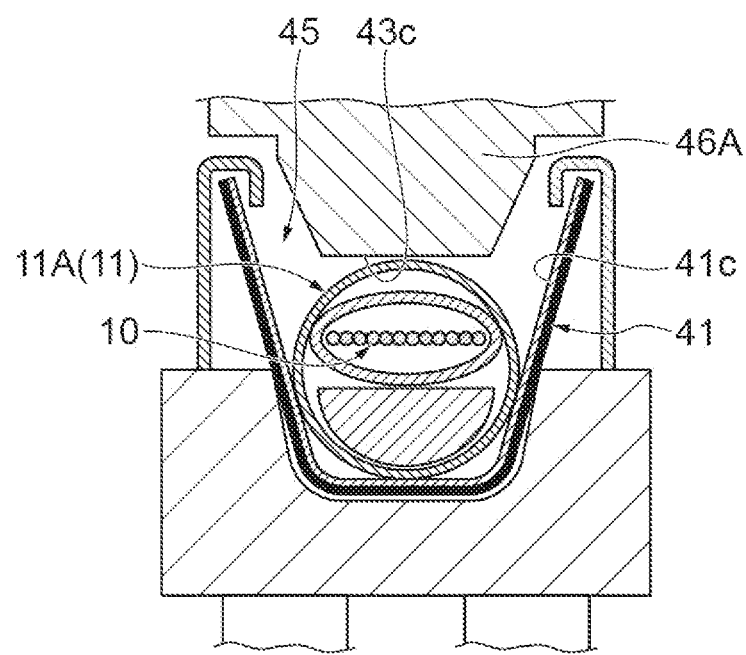
FIG. 9A is a cross sectional view taken along the short-side direction of the cover in FIG. 7.
Figure 9B:
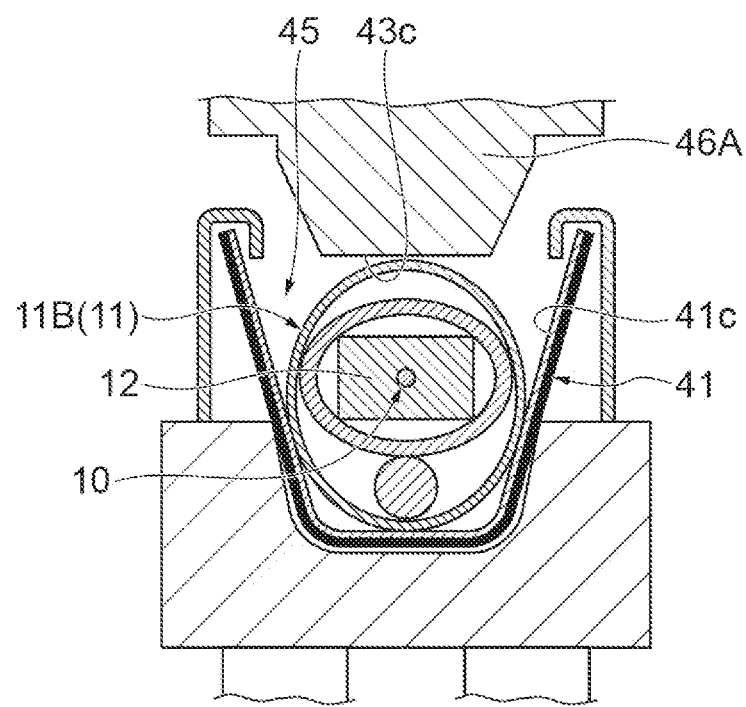
FIG. 9B is a cross sectional view taken along the short-side direction of the cover in FIG. 7.
Figure 10A:
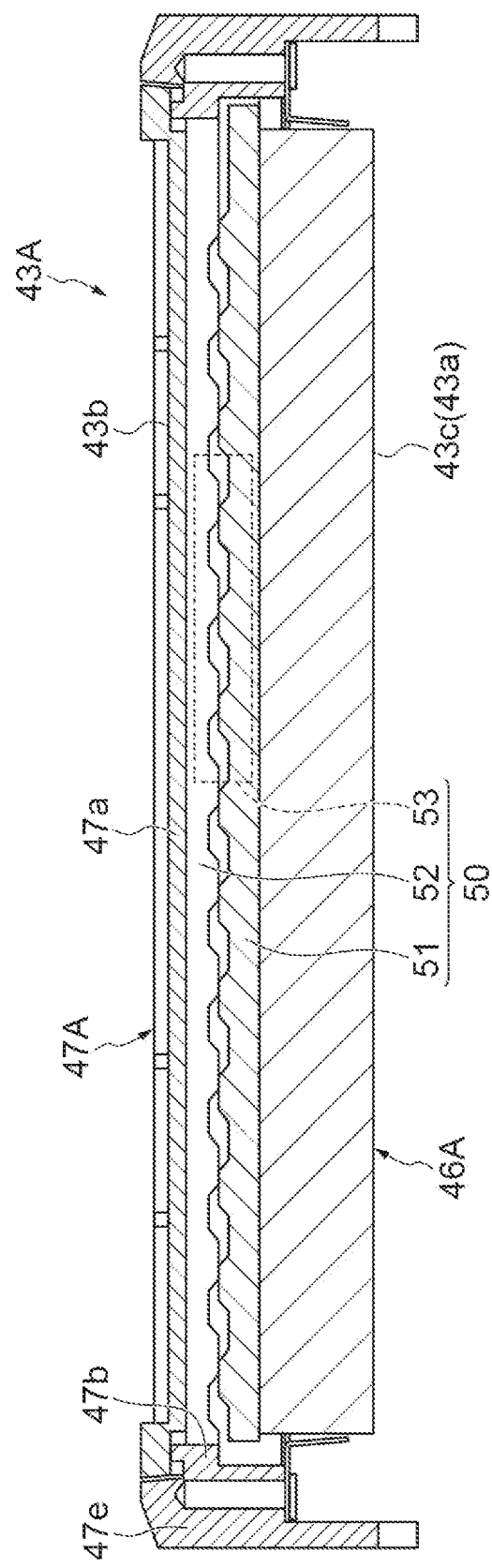
FIG. 10A is a cross sectional view taken along the long-side direction of the cover in FIG. 7.

The cover 43A has no spring 48. The cover 43A is different from the cover 43A in that the position of the contact surface 43c is configured variable using the action other than the elastic force of the springs 48. FIGS. 9A and 9B are cross sectional views taken along the short-side direction of the cover 43A in FIG. 7. FIGS. 10A and 10B are cross sectional views taken along the long-side direction of the cover 43A in FIG. 7. As shown in FIGS. 7 to 10B, the cover 43A has a contact member 46A including the contact surface 43c, a retaining member 47A that retains the contact member 46A, and a switching mechanism 50. The switching mechanism 50 switches the position of the contact member 46A step by step in the direction of pushing the contact surface 43c into the inside of the housing space 45 (i.e., in the direction in which the contact surface 43c is separated from the outer surface 43b) (see FIGS. 9A and 9B). The switching mechanism 50 switches the retaining position of the contact member 46A on the retaining member 47A, for example. The switching mechanism 50 is composed of a first engagement part 51 provided on the contact member 46A, a second engagement part 52 provided on the retaining member 47, and an operating unit 53 that operates the switching of the retaining position.

The contact member 46A is provided with no spring holder 46a in FIG. 5. The contact member 46A is provided with the first engagement part 51 and the operating unit 53. The contact member 46A may be configured similarly to the contact member 46 on the other points. The retaining member 47A is provided with no spring holder 47c in FIG. 5. The retaining member 47A is provided with the second engagement part 52. The retaining member 47A may be configured similarly to the retaining member 47 on the other points.

The first engagement part 51 and the second engagement part 52 present shapes capable of engaging with each other, and are provided at positions at which the first engagement part 51 and the second engagement part 52 are capable of engaging with each other. The first engagement part 51 and the second engagement part 52 present shapes capable of maintaining the contact state in which the first engagement part 51 and the second engagement part 52 are in contact with each other at positions different from the positions in the engagement state in which the first engagement part 51 and the second engagement part 52 engage with each other. The operating unit 53 changes the position of the first engagement part 51 in order to switch between the engagement state and the contact state. The switching mechanism 50 causes the outer surface 43b to be the most apart from the contact surface 43c in the engagement state (see FIG. 10B), and brings the outer surface 43b close to the contact surface 43c in the contact state (see FIG. 10A). As described above, the switching mechanism 50 switches the relative position of the contact member 46A step by step to the outer surface 43b.

For example, the first engagement part 51 and the second engagement part 52 present irregular shapes having a plurality of flat top surfaces and a plurality of flat bottom surfaces. The plurality of top surfaces and the plurality of bottom surfaces are arranged alternatively along the long-side direction of the cover 43A. The operating unit 53 is a lever, for example. The operating unit 53 moves the position of the first engagement part 51 by being pushed and pulled along the long-side direction of the cover 43A, for example.

As shown in FIG. 10B, in the engagement state, the top surfaces of the first engagement part 51 and the bottom surfaces of the second engagement part 52 are in contact with each other, and the bottom surfaces of the first engagement part 51 and the top surfaces of the second engagement part 52 are in contact with each other. Thus, as shown in FIG. 9B, the contact surface 43c is disposed at the position close to the opening of the housing space 45. On the other hand, as shown in FIG. 10A, in the contact state, the top surfaces of the first engagement part 51 and the second engagement part 52 are in contact with each other, and the bottom surfaces of the first engagement part 51 and the second engagement part 52 are apart from each other. Thus, as shown in FIG. 9A, the position of the contact surface 43c is disposed at the position apart from the opening in the housing space 45. As described above, according to the switching mechanism 50, the position of the contact surface 43c is switched in two stages, the engagement state and the contact state.

The switching mechanism 50 may switch the position of the contact surface 43c in three stages or more from a configuration capable of maintaining a plurality of contact states in which the first engagement part 51 and the second engagement part 52 are in contact with each other at a plurality of positions different from the positions in the engagement state. Moreover, together with the switching mechanism 50, the cover may be configured with the combination of a mechanism that makes the position of the contact surface 43c variable by the action of elastic force, or with the combination of a mechanism using the action other than elastic force.

According to this reinforcement sleeve heating device 4A, the position of the contact surface 43c can be easily adjusted corresponding to each of a plurality of types of reinforcement sleeves 11 in sizes different from each other in the depth direction of the housing space 45.

REFERENCE SIGNS LIST 1 fusion splicing machine
2 housing
3 fusion splicing device
3a optical fiber holder
3b fiber positioning unit
3c discharge electrode
4, 4A reinforcement sleeve heating device
5 monitor
6 wind protection cover
6a side surface
6b inlet port
10 optical fiber
10a glass part
10b cladding part
10c end face
11, 11A, 11B reinforcement sleeve
11a thermal shrinkage tube
11b tensile strength body
11c inner tube
12 drop cable
41 heating element
41a heat dissipation plate
41b film type heater
41c inner surface
42 heating element retaining, part
42a base part
42b fixing part
43, 43A cover
43a inner surface
43b outer surface
43c contact surface
44 fiber disposing part
44a disposing groove
44b rotating shaft
45 housing space
46, 46A contact member
46a spring holder
46b flange
47, 47A retaining member
47a cover part
47b side wall part
47c spring holder
47d projection
47e coupling part
48 spring
50 switching mechanism
51 first engagement part
52 second engagement part
53 operating unit.

The invention claimed is:

1. A reinforcement sleeve heating device heating a reinforcement sleeve put on a connecting site to shrink the reinforcement sleeve in order to reinforce the connecting site of optical fibers fusion-spliced to each other, the reinforcement sleeve heating device comprising:
a heating element forming a housing space, the housing space extending in a predetermined direction, the housing space being opened in one direction intersecting with the predetermined direction, the housing space being capable of accommodating the reinforcement sleeve; and
a cover including (i) a contact member including a contact surface formed on a bottom part of the contact member, the contact member extending in a longitudinal direction of the housing space and presenting a box shape that is open at a side of the contact member opposite to the housing space, (ii) a retaining member configured to retain the contact member, and (iii) a spring that presses the contact member toward a projection of the retaining member, the cover being disposed at a position at which at least a part of the opening of the housing space is covered, wherein
in a state in which the reinforcement sleeve is disposed in the housing space, the contact surface is brought into contact with the reinforcement sleeve in a direction of pushing the reinforcement sleeve into an inside of the housing space,
the cover is configured such that a position of the contact surface is variable in the pushing direction, and
the spring is configured to apply elastic force to the contact member in the pushing direction.

2. The reinforcement sleeve heating device according to claim 1, wherein
the cover has
a switching mechanism configured to switch a position of the contact member step by step in the pushing direction.

3. The reinforcement sleeve heating device according to claim 1, wherein
the cover is made of a resin.

4. The reinforcement sleeve heating device according to claim 1, wherein
the cover is formed hollow.

5. The reinforcement sleeve heating device according to claim 1, wherein an upper end part of the contact member includes a flange.

6. The reinforcement sleeve heating device according to claim 5, wherein the retaining member includes a cover part and a side wall part, a first end part of the side wall part is connected to an edge part of the cover part, and a second end part of the side wall part includes the projection, which abuts against the flange and restricts travel of the flange toward the housing space.

7. A fusion splicing machine comprising: a fusion splicing device configured to fusion-splice optical fibers to each other; and the reinforcement sleeve heating device according to claim 1.

\* \* \* \* \*